Aug. 8, 1933.
W. JOURDAN
1,921,231
APPARATUS FOR COOKING
Filed July 12, 1929
2 Sheets-Sheet 1
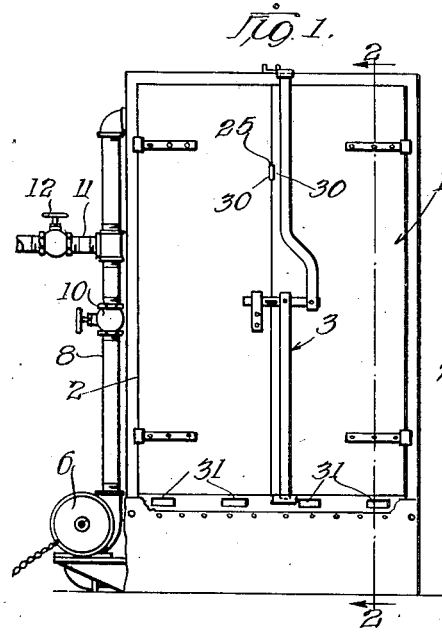
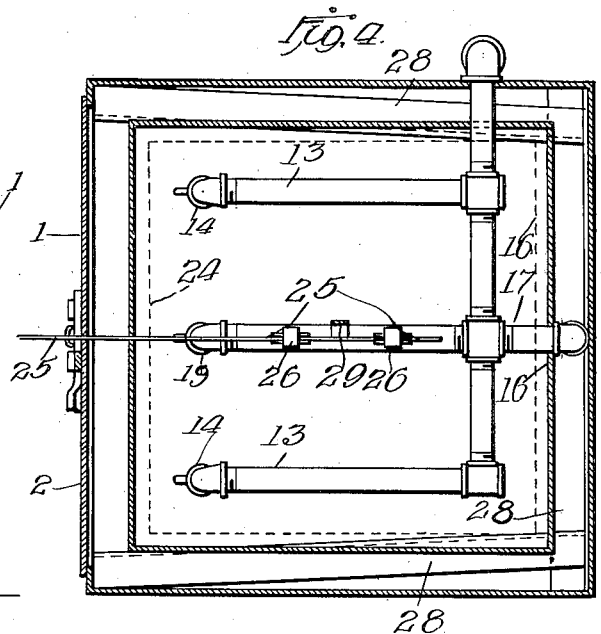
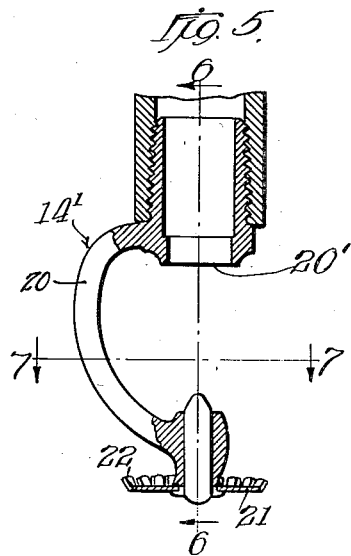
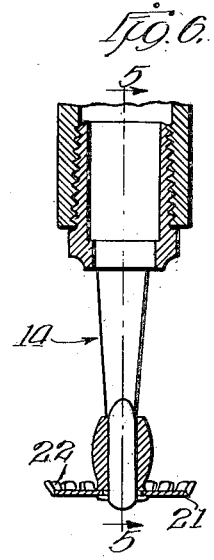
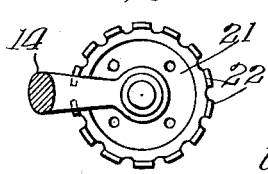
Witnesses:
Harry R. L. White
Robert Cremer
Inventor:
William Jourdan
Edward Fay Wilson
By Attorney

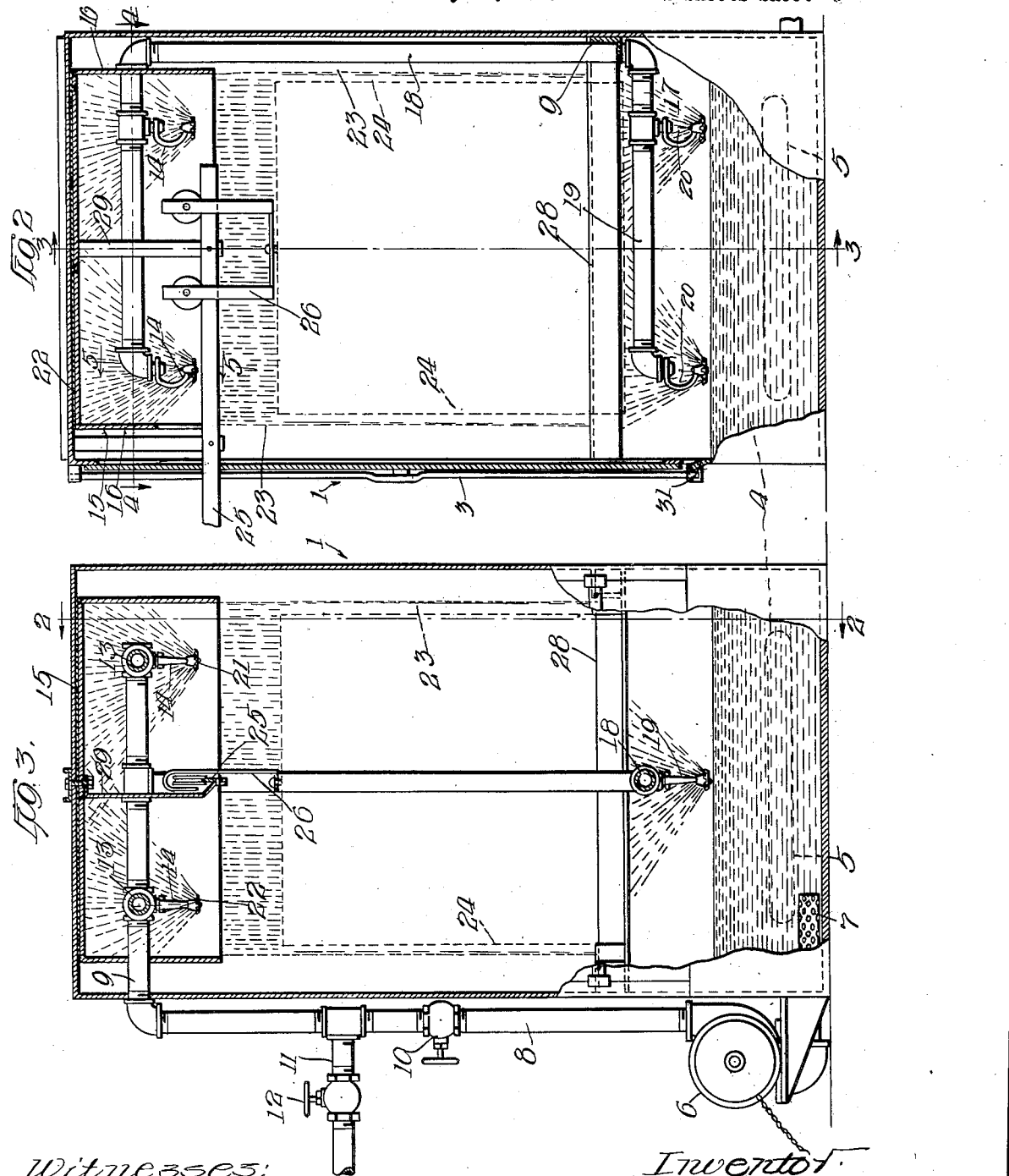

Patented Aug. 8, 1933

1,921,231

UNITED STATES PATENT OFFICE 1,921,231

APPARATUS FOR COOKING

William Jourdan, Chicago, Ill.

Application July 12, 1929. Serial No. 377,82

8 Claims. (Cl. 99—2)

This invention relates to improvements in means and methods of cooking food products and especially meat products.

The object of the invention is to provide such means and methods that shall quickly and uniformly cook an associated quantity of meat products such as hams or various kinds of sausages.

The present invention is an improvement upon my earlier invention disclosed and claimed in United States Letters Patent No. 1,690,449, issued to me November 6, 1928, wherein is disclosed a novel method of applying hot water to such meat products to cook them.

In the present invention, means are provided for quickly bringing the cabinet to a substantially uniform temperature and for maintaining it at such uniform temperature during the cooking period, thus not only hastening the process but also resulting in more excellent and uniform products.

Another feature of the invention relates to means provided for practically insulating the products from the outer walls of the cabinet, this also resulting in quicker, better and more uniformly cooked products.

The invention will be more readily understood by reference to the accompanying drawings forming part of this specification and in which:—

Fig. 1 is a front view of a cooking cabinet constructed and equipped in accordance with this invention and which I have found to be best suited for practicing my improved process of cooking;

Fig. 2 is a vertical section on the line 2—2 of Figs. 1 and 3;

Fig. 3 is a central, vertical section on the line 3—3 of Fig. 2;

Fig. 4 is a horizontal section on the line 4—4 of Fig. 2;

Fig. 5 is a fragmentary vertical section on the line 5—5 of Fig. 2;

Fig. 6 is a similar section on the line 6—6 of Fig. 5; and

Fig. 7 is a horizontal section on the line 7—7 of Fig. 5.

In said drawings, 1 illustrates a cooking cabinet preferably made of sheet metal and provided with hinged doors 2 at its front, which can be opened for filling and emptying the cabinet. Simple lever and bolt means 3 are provided for latching the doors closed. The cabinet is preferably rectangular in horizontal cross-section, and suitable means, not shown, are provided for conveniently entering and removing racks which are used to hold the products to be cooked.

The cabinet is provided with a sump or well portion 4 at its lower end for collecting and containing the hot water which is used in the cooking process. Suitable means, such as a steam coil 5, may be used in the sump to supply heat to the water.

The hot water is drawn from the sump 4 by a pump 6 through an intake 7 near the bottom of the sump and is forced to the top of the cabinet through a vertical delivery pipe 8. The pipe 8 connects with a horizontal pipe 9 which projects into the cabinet near its top and also near its rear side. The delivery pipe 8 is controlled by a hand valve 10, and a water supply pipe 11 connects with the pipe 8 above the valve 10, through which cold water can be supplied for cooling off and washing the products after they have been cooked. This supply pipe 11 is controlled by a hand valve 12.

Connected with the horizontal delivery pipe 9 are two forwardly extending distribution pipes 13, each provided with two delivery nozzles 14, thus providing four delivery nozzles in the upper part of the cabinet.

Surrounding the four delivery nozzles is a rectangular baffle dome or deflector 15. This deflector is in the form of an open-bottomed rectangular pan, the side walls 16 of which are spaced slightly from the side walls of the cabinet.

The horizontal delivery pipe 9 has a rearwardly extending extension 17 at substantially the middle of the cabinet, which connects outside of the rear wall 16 of the deflector with a vertical pipe 18 which connects at its lower end with a horizontal distribution pipe 19 extending out above the sump 4. This distribution pipe 19 is provided with two discharge nozzles 20 similar to the nozzles 14, one near the front and one near the rear of the cabinet.

The delivery nozzles 14 and 20 have relatively large discharge openings 20' directed downwardly and adapted to emit a relatively large and solid stream of water. Each discharge nozzle is provided with a centrally disposed deflecting plate or disk 21 below the discharge opening 20' and against which the stream of water is directed.

The disk 21 has an upwardly turned serrated marginal edge 22 which causes the stream escaping through the opening 20 to be broken up into innumerable fine streams and to be directed upwardly as indicated in the drawings.

The upper discharge nozzles are arranged slightly above the lower edges of the side walls 16 of the deflector dome 15 and streams directed upwardly from the nozzle deflectors 21 strike up into the deflector dome impinging against the top wall 22 of same and against the vertical sides 16 at various angles. The various small streams are thereby further broken up and intermingled, and the drops of hot water fall down upon the food products thus during the cooking process constantly bathing the products with hot water in the form of drops which do not strike the products at any definite points.

Considerable of the hot water thrown up into the deflector hood is deflected down along the inner surfaces of the side walls 16 of the hood and form a hot water curtain 23 spaced slightly inwardly from the walls of the cabinet.

The nozzles 19 at the bottom of the cabinet also direct the streams of water upwardly, thus not only subjecting the products to these streams of hot water from beneath but releasing heat in the lower part of the cabinet. When the hot water is delivered into the cabinet through the nozzles, the whole interior of the cabinet is filled with the fine sprays and drops of hot water, thus quickly heating the contents of the cabinet.

In using the cabinet, the doors 2 are opened and the products to be cooked placed in the cabinet; the doors are then closed, and the pump 6 is started to deliver the hot water from the sump to the nozzles.

The dotted lines 24 indicate the dimensions of a suitable rack upon which the meat products are supported during the cooking process.

Usually the products to be cooked are placed on the rack, and they are thus within the area defined by the depending side walls of the dome 15.

For easily loading and unloading the cabinet, an elevated rail 25 is provided, upon which a suitable wheeled trolley 26 is run, and the rack indicated by the dotted lines 24 is suspended from the trolley.

Suitable means, such as angle iron members 27 and 28, are arranged to center the rack in the cabinet and properly position it below the spray dome 15.

The track 25 enters the cabinet and is suspended therein by a suitable suspending bracket 29.

The doors 2 are notched, as shown at 30, to pass the track 25.

When the rack containing the products to be cooked is placed in the cabinet and the doors are closed, the rack, as explained, is centered beneath the spray dome 15, and, the water in the sump being hot, the pump is started and the cooking process is begun.

The relatively cold air with which the cabinet is filled at the beginning of the cooking process is a detriment to the quick and even heating of the contents, and the hot vapor released from the hot water produces a slight pressure within the cabinet. I make use of this slight pressure to quickly discharge the cold air from the cabinet. This cold air is heavier than the vapors, and I provide a row of discharge openings 31 in the front of the cabinet just above the normal level of the water in the sump, through which openings the cold air is quickly discharged. I am thus enabled, by the use of the discharge nozzles 20 at the bottom and the forcing out of the cold air through the openings 31, to quickly bring the interior of the cabinet and the contents to the maximum cooking temperature throughout, and consequently I am enabled to thoroughly cook all of the contents in a minimum time.

As many modifications of the invention will readily suggest themselves to one skilled in the art, I do not limit or confine the invention to the specific details of construction herein shown and described.

I claim:

1. In a cooking device of the kind described, spray nozzles in the upper part thereof adapted to project hot water upwardly, means in the top of the device adapted to cause the hot water to form vertical sheets adjacent to the outer walls, and means for supporting the products to be cooked within said sheets of water.

2. In a cooking device of the kind described, nozzles in the upper part thereof for discharging hot water upwardly in the form of a spray, a hood in the upper part of the cabinet into which the nozzles discharge, peripheral walls of the hood being adapted to cause part of the water discharged to descend in the form of hot water curtains spaced from the outer wall of the cabinet.

3. In a cooking device of the kind described, nozzles in the upper part thereof for discharging hot water upwardly in the form of a spray, a hood in the upper part of the cabinet into which the nozzles discharge, peripheral walls of the hood being adapted to cause part of the water discharged to descend in the form of hot water curtains spaced from the outer wall of the cabinet, and hot water discharge nozzles in the lower part of the cabinet adapted to discharge upwardly.

4. A cabinet for containing products to be cooked, spray nozzles in the upper part thereof for discharging hot water into the cabinet, a deflector dome in the upper part of the cabinet into which the water is sprayed, nozzles in the lower part of the cabinet for discharging a hot cooking medium, and the cabinet provided with a plurality of air discharge openings near its lower end through which the cool air in the cabinet at the beginning of the cooking process can be discharged.

5. In a cooking device of the kind described, nozzles in the upper part thereof for discharging hot water in the form of a spray, a deflector dome in the upper part of the cabinet into which the water is sprayed, and other nozzles in the lower part of the cabinet for discharging hot water upwardly in the form of a spray.

6. In a cooking device of the kind described, a cabinet, a baffle dome in the upper part thereof having depending side walls adjacent to the side walls of the cabinet, nozzles in the upper part of the cabinet for discharging hot water upwardly against the dome in the form of a spray and other nozzles in the lower part of the cabinet for discharging hot water upwardly in the form of a spray.

7. In a cooking device of the kind described, a cabinet which is fairly tight, a spray deflecting hood in the upper part thereof which is water tight and has depending side walls adjacent to the side walls of the cabinet and a spray nozzle arranged and adapted to direct a spray-like stream of hot water upwardly into the hood.

8. In a food cooking device of the kind described, a cabinet for containing the food to be cooked, a deflector dome in the upper part thereof for deflecting hot water sprays projected therein to and directing the hot water downwardly in the form of curtains out of contact with the walls of the cabinet and spray nozzles arranged and adapted to direct spray-like streams of hot water upwardly into the dome.

WILLIAM JOURDAN.